US 6,590,707 B1

(12) United States Patent
Weber

(10) Patent No.: US 6,590,707 B1
(45) Date of Patent: Jul. 8, 2003

(54) BIREFRINGENT REFLECTORS USING ISOTROPIC MATERIALS AND FORM BIREFRINGENCE

(75) Inventor: Michael F. Weber, Shoreview, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/541,463

(22) Filed: Mar. 31, 2000

(51) Int. Cl.$^7$ ................................................. G02B 5/30
(52) U.S. Cl. .................... 359/498; 359/359; 359/494; 359/500; 359/577; 359/580; 359/587; 359/589; 428/212
(58) Field of Search .................... 359/359, 485, 359/487, 488, 493–494, 498, 500, 577, 580, 587, 589; 428/212

(56) References Cited

U.S. PATENT DOCUMENTS

| 540,768 A | 6/1895 | Western |
| 3,124,639 A | 3/1964 | Kahn ........................... 88/65 |
| 3,610,729 A | 10/1971 | Rogers ........................ 350/157 |

(List continued on next page.)

FOREIGN PATENT DOCUMENTS

| WO | WO 95/27919 | 4/1995 | ........... G02B/27/28 |
| WO | WO 95/17303 | 6/1995 | ............. B32B/7/02 |
| WO | WO 95/17691 | 6/1995 | ............. G02B/5/30 |
| WO | WO 95/17692 | 6/1995 | ............. G02B/5/30 |
| WO | WO 95/17699 | 6/1995 | ......... G02F/1/1335 |
| WO | WO 97/01440 | 1/1997 | ........... B32B/27/36 |
| WO | WO 97/01774 | 1/1997 | ............. G02B/1/10 |
| WO | WO 99/36248 | 7/1999 | ........... B29C/47/70 |
| WO | WO 99/36258 | 7/1999 | ............. B32B/7/02 |
| WO | WO 99/36262 | 7/1999 | ........... B32B/27/00 |

OTHER PUBLICATIONS

Azzam et al., "Reflection and Transmission of Polarized Light/Stratified Anisotropic Planar Structures", Ellipsometry and Polarized Light, N H Elsevier, 1987, pp. 340–352.
Berreman, D. W., "Optics in Stratified and Anisotropic Media: 4x4–Matrix Formulation", J. Opt. Soc. Am. 62 (1972), pp. 502–510.
Born et al., "Optics of Crystals", Principles of Optics, Electromagnetic Theory of Propagation, Interference and Diffraction of Light, Sixth Edition, Pergamon Press, 1980, pp. 705–708.
Eblen, Jr., et al., "Thin–Film Birefringent Devices Based on Form Birefringence", SPIE, vol. 2262, 3/94, pp. 234–245.
Gu et al., "Form birefringence of layered media and volume gratings", J. Opt. Soc. Am. B, vol. 12, No. 6, Jun. 1995, pp. 1094–1099.
Hodgkinson et al., "Empirical equations for the principal refractive indices and column angle of obliquely deposited films of tantalum oxide, titanium oxide, and zirconium oxide", Applied Optics, vol. 37, No. 13, May 1, 1998, pp. 2653–2659.

(List continued on next page.)

*Primary Examiner*—Cassandra Spyrou
*Assistant Examiner*—Craig Curtis
(74) *Attorney, Agent, or Firm*—Stephen C. Jensen

(57) ABSTRACT

Multilayer thin film reflectors, such as mirrors and reflective polarizers, are described in which form birefringent optical layers are incorporated into a plurality of optical repeat units in the film. The form birefringent layers exhibit birefringence as a result of microscopic structures that have a dimension that is small compared to the wavelength of light but large compared to molecular distances. The optical layers within the optical repeat units have out-of-plane indices of refraction that are tailored to produce desired effects as a function of incidence angle for p-polarized light. The multilayer reflectors can be made by conventional vacuum deposition techniques using known inorganic optical materials, but can also be made entirely with polymeric materials by co-extrusion or other processes.

30 Claims, 10 Drawing Sheets

U.S. PATENT DOCUMENTS

| | | | | |
|---|---|---|---|---|
| 3,711,176 | A | | 1/1973 | Alfrey, Jr. et al. ............... 350/1 |
| 3,860,036 | A | | 1/1975 | Newman, Jr. ................. 138/45 |
| 4,446,305 | A | | 5/1984 | Rogers et al. ............... 528/348 |
| 4,520,189 | A | | 5/1985 | Rogers et al. ............... 528/331 |
| 4,521,588 | A | | 6/1985 | Rogers et al. ............... 528/363 |
| 4,525,413 | A | | 6/1985 | Rogers et al. ............... 428/212 |
| 4,720,426 | A | | 1/1988 | Englert et al. ............... 428/344 |
| 4,725,113 | A | | 2/1988 | Chang et al. |
| 4,915,503 | A | | 4/1990 | Pavlath |
| 5,188,760 | A | | 2/1993 | Hikmet et al. ......... 252/299.01 |
| 5,196,953 | A | | 3/1993 | Yeh et al. |
| 5,211,878 | A | | 5/1993 | Reiffenrath et al. .... 252/299.63 |
| 5,235,443 | A | | 8/1993 | Barnik et al. .................. 359/37 |
| 5,269,995 | A | | 12/1993 | Ramanathan et al. ........ 264/171 |
| 5,294,657 | A | | 3/1994 | Melendy et al. ............. 524/270 |
| 5,316,703 | A | | 5/1994 | Schrenk ....................... 264/1.3 |
| 5,319,478 | A | | 6/1994 | Fijnfschilling et al. ........ 359/53 |
| 5,389,324 | A | | 2/1995 | Lewis et al. ................. 264/171 |
| 5,448,404 | A | | 9/1995 | Schrenk et al. ............. 359/584 |
| 5,486,935 | A | | 1/1996 | Kalmanash ................... 359/37 |
| 5,486,949 | A | | 1/1996 | Schrenk et al. ............. 359/498 |
| 5,612,820 | A | | 3/1997 | Schrenk et al. ............. 359/498 |
| 5,629,055 | A | | 5/1997 | Revol et al. .................... 428/1 |
| 5,638,197 | A | | 6/1997 | Gunning, III et al. |
| 5,686,979 | A | | 11/1997 | Weber et al. .................. 349/96 |
| 5,699,188 | A | | 12/1997 | Gilbert et al. ............... 359/584 |
| 5,721,603 | A | | 2/1998 | De Vaan et al. ............ 349/194 |
| 5,744,534 | A | | 4/1998 | Ishiharada et al. ........... 524/442 |
| 5,751,388 | A | | 5/1998 | Larson ........................ 349/96 |
| 5,767,935 | A | | 6/1998 | Ueda et al. .................. 349/112 |
| 5,770,306 | A | | 6/1998 | Suzuki et al. ............... 428/328 |
| 5,783,120 | A | | 7/1998 | Ouderkirk et al. ........... 264/134 |
| 5,793,456 | A | | 8/1998 | Broer et al. ................... 349/98 |
| 5,808,794 | A | | 9/1998 | Weber et al. ............... 359/487 |
| 5,808,798 | A | | 9/1998 | Weber et al. ............... 359/583 |
| 5,825,542 | A | | 10/1998 | Cobb, Jr. et al. ............ 359/487 |
| 5,825,543 | A | | 10/1998 | Ouderkirk et al. .......... 359/494 |
| 5,882,774 | A | * | 3/1999 | Jonza et al. ................. 428/212 |
| 5,929,946 | A | | 7/1999 | Sharp et al. |
| 5,940,149 | A | | 8/1999 | Vanderwerf ..................... 349/5 |
| 5,962,114 | A | | 10/1999 | Jonza et al. ................. 428/212 |
| 5,965,247 | A | | 10/1999 | Jonza et al. ................. 428/212 |

OTHER PUBLICATIONS

Hodgkinson et al., "Serial bideposition of anisotropic thin films with enhanced linear birefringence", Applied Optics, vol. 38, No. 16, Jun. 1, 1999, pp. 3621–3625.

Hodgkinson et al., Effective principal refractive indices and column angles for periodic stacks of thin birefringent films, Optical Society of America, vol. 10, No. 9, p. 2065–2071, Sep. 1993, pp. 2065–2071.

Hodgkinson et al., "Birefringent thin–film polarizers for use at normal incidence and with planar technologies", Applied Physics Letters, vol. 74, No. 13, Mar. 29, 1999, pp. 1794–1796.

Hodgkinson et al., "Anisotropic antireflection coatings: design and fabrication", Optics Letters, vol. 23, No. 19, Oct. 1, 1998, pp. 1553–1555.

Jacobson et al., "Deposition, Characterization, and Simulation of Thin Films with Form Birefringence", SPIE, vol. 505, Advances in Optical Materials, 1984, pp. 228–235.

Kitagawa et al., "Form birefringence of $SiO_2/Ta_2O_5$ periodic multilayers", Applied Optics, vol. 24, No. 20, Oct. 15, 1985 p. 3359–3362.

Richter et al., "Design considerations of form birefringent microstructures", Applied Optics, vol. 34, No. 14, May 10, 1995, pp. 2421–2429.

Robbie et al., "Chiral sculptured thin films", Nature, vol. 384, 12/96, p. 616.

Robbie et al., "First thin film realization of a helicoidal bianisotropic medium", J. Vac. Sci. Technol. A 13(6), Nov./Dec. 1995, pp. 2991–2993.

Rytov, S.M., "Electromagnetic Properties of a Finely Stratified Medium", Soviet Physics JETP, vol. 2, No. 3, May 1956, pp. 466–475.

Schrenk et al., Nanolayer polymeric optical films, Tappi Journal, pp. 169–174, Jun., 1992.

Shiraishi et al., "Experimental verification of a form–birefringent polarization splitter", Appl. Phys. Lett. 58 (3), Jan. 21, 1991, pp. 211–212.

Tyan et al., "Polarizing beam splitters constructed of form–birefringent multilayer gratings", SPIE, vol. 2689, 8/96, pp. 82–89.

Weber et al., "Giant Birefringent Optics in Multilayer Polymer Mirrors", Science, vol. 287, Mar. 31, 2000, pp. 2451–2456.

Xu et al., "Fabrication, modeling, and characterization of form–birefringent nanostructures", Optics Letters, vol. 20, No. 24, Dec. 15, 1995, pp. 2457–2459.

* cited by examiner

BIREFRINGENT REFLECTORS USING ISOTROPIC MATERIALS AND FORM BIREFRINGENCE

BACKGROUND

The present invention relates to reflectors such as mirrors and reflective polarizers that utilize multilayer interference stacks of various materials to achieve a desired optical performance.

The reader is directed to the glossary at the end of the specification for guidance on the meaning of certain terms used herein.

Thin film birefringent mirrors that comprise birefringent polymer layers are known. See, e.g., U.S. Pat. Nos. 5,808, 798 (Weber et al.) and 5,882,774 (Jonza et al.), both of which are incorporated herein by reference, and PCT Publication WO 99/36258 (Weber et al.). Such mirrors can have spectrally broadband or narrowband reflection characteristics as desired by appropriate selection of the individual layer thicknesses and refractive indices. Furthermore, it is known to tailor the out-of-plane (z-direction) refractive indices of two adjacent layers in the optical repeat units of birefringent multilayer mirrors and polarizers so that the reflectivity for the p-polarization component of obliquely incident light decreases slowly with increasing angle of incidence, is independent of the angle of incidence, or increases as the angle of incidence increases. Substantially matching the out-of-plane refractive indices causes the left (short wavelength) bandedges of s- and p-polarized light to be matched, which is useful for certain color beamsplitting applications. Both the left and right (short and long wavelength) bandedges of s- and p-polarized light can be matched over a desired range of angles if the difference between the out-of-plane refractive indices is substantial and of the opposite sign as the in-plane refractive index difference.

To date, reflecting films having these highly desirable angular properties have been fabricated from two or more co-extruded polymeric materials, at least one of which has in-plane refractive indices that change during a post-extrusion stretching procedure. In addition to the unique angular performance capabilities, the polymeric materials and processing techniques used have inherent advantages in certain respects over conventional vacuum deposited thin film reflectors, such as the ability to make very high quality reflectors in high volumes and at relatively low overall cost. However, the processing techniques and/or polymeric materials also have inherent disadvantages in certain other respects, such as difficulty in making low volumes of the film economically, difficulty meeting certain stringent flatness specifications, and difficulty surviving in applications where the film is exposed to substantial amounts of ultraviolet light or to temperatures above about 200 degrees C. High angularity reflective films that avoid one or more of these difficulties would be highly useful in a variety of applications.

Hence, there is a need in the art for precision birefringent reflectors which can be made from inorganic materials and optically flat substrates, using available vacuum coating techniques.

The concept of "form birefringence" has long been known in the field of optics, but has been treated largely as a mere curiosity. Unlike conventional birefringent materials, which exhibit different refractive indices as a result of an anisotropic physical structure on a molecular scale, materials that are form birefringent exhibit different refractive indices as a result of an anisotropic physical structure on a scale much larger than molecular but much smaller than the wavelength of light. Such form birefringent materials can be fabricated using conventional vacuum deposition equipment and with conventional inorganic materials that form isotropic layers in most modern optical thin film coatings. Form birefringent films have been demonstrated both as uniaxially birefringent films, in which the in-plane refractive indices $n_x$, $n_y$ are substantially equal but different from the out-of-plane refractive index $n_z$, and as biaxially birefringent films in which none of the indices are substantially equal. (Throughout this specification, for convenience, films and their constituent layers and microlayers 30 are considered to lie in the x-y plane of a Cartesian x-y-z coordinate system, even though such films or layers can be flexed or bent, or deposited onto nonplanar substrate.) Both positive and negative uniaxial form birefringent films are known in the art. A negative uniaxial form birefringent film ($n_x \approx n_y > n_z$) is described in U.S. Pat. No. 5,196,953 (Yeh et al.) for use as a compensator plate in a liquid crystal display. Positive uniaxial form birefringent films ($n_x \approx n_y > n_z$), which contain microscopic columnar structures oriented parallel to the z-axis as a consequence of deposition conditions, are also known. See for example "Effective Principal Refractive Indices and Column Angles for Periodic Stacks of Thin Birefringent Films", J. Opt. Soc. Am. A, Vol. 10, No. 9, September 1993, pp. 2065–2071, or "Deposition, Characterization, and Simulation of Thin Films With Form Birefringence", SPIE Advances in Optical Materials (1984), Vol. 505, pp. 228–235. Biaxial form birefringent films are discussed in U.S. Pat. No. 5,638,197 (Gunning, III et al.), incorporated herein by reference, as compensation devices in liquid crystal displays.

However, the benefits of using such form birefringent materials in high angularity reflective films, where the z-index of adjacent layers is tailored to achieve a desired angular behavior in the reflection or transmission of a polarizer or mirror, have not been taught or appreciated by others. Such benefits are particularly important for polarizing beamsplitters and color separation filters required to work at high angles of incidence, most notably where the reflector is immersed in a high index medium such as glass. Such applications of both mirrors and reflecting polarizers require the careful control of the reflectivity of p-polarized light compared to that for s-polarized light at oblique angles, which in turn requires careful control of the z-index.

BRIEF SUMMARY

Disclosed herein are reflectors such as mirrors or reflective polarizers that comprise a plurality of thin film optical repeat units to achieve reflection or transmission of light as a function of wavelength, polarization state, and direction of incidence. The reflectors include in a plurality of the optical repeat units at least one optical layer that is form birefringent. Further, the form birefringent layer and another optical layer in the optical repeat units have z-indices that are tailored to produce a desired optical effect as a function of incidence angle. Sometimes, this corresponds to z-indices for such layers that differ by no more than about 80%, more preferably by no more than about half, and even more preferably by no more than about 20%, of the maximum in-plane mismatch between such layers. In some cases, however, the desired z-index difference is large and of opposite sign as the in-plane index differences, or in the case of biaxial birefringent polarizers, as large as possible and of opposite sign as the largest in-plane refractive index difference, but not larger in magnitude than such largest in-plane index difference.

In some embodiments, the optical repeat units include a negative uniaxial form birefringent optical layer. In other embodiments, the optical repeat units include a positive uniaxial form birefringent optical layer. In some of the embodiments both negative uniaxial and positive uniaxial form birefringent optical layers are included. In still other embodiments, biaxial form birefringent layers are included.

BRIEF DESCRIPTION OF THE DRAWINGS

The invention will now be described more particularly with the aid of certain drawings, in which.

Figure 1:
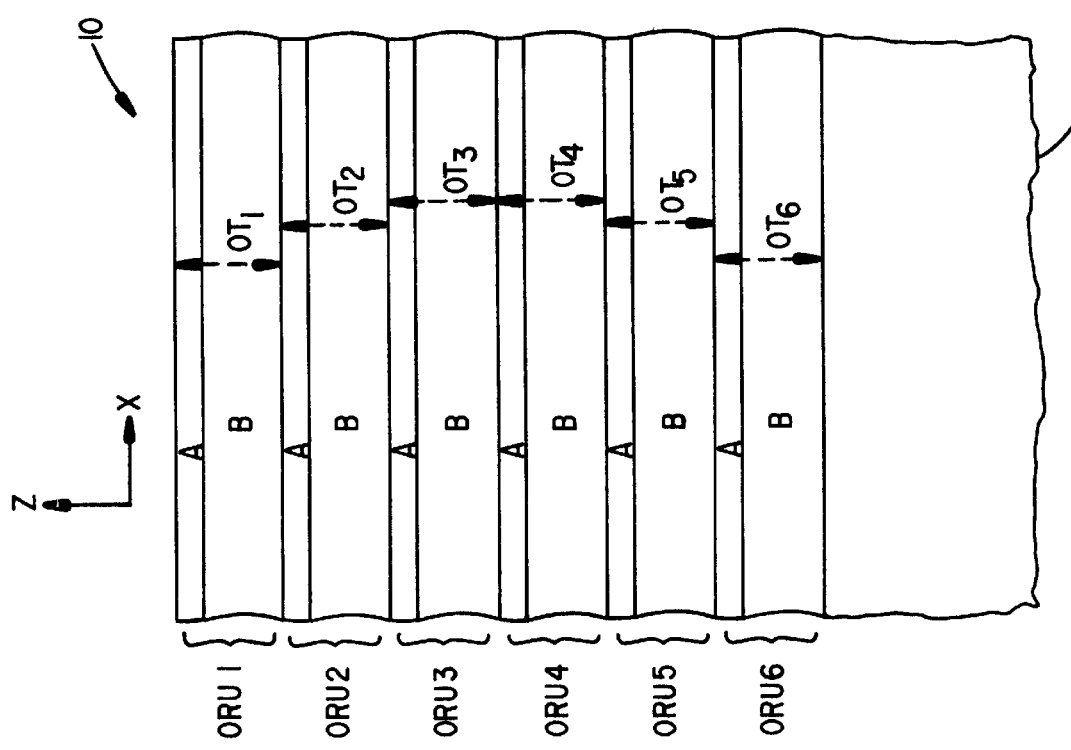
FIG. 1 is a sectional view of a multilayer optical film.

In the drawings, the same reference symbol is used for convenience to indicate elements which are the same or which perform the same or a similar function.

DETAILED DESCRIPTION OF THE ILLUSTRATIVE EMBODIMENTS

In FIG. 1, a portion of a multilayer optical film reflector 10 is shown deposited on a substrate 12. The reflector comprises a plurality of distinct layers of optically transmissive material, the layers being arranged in a repeating sequence A,B as shown to define a plurality of optical repeat units, labeled ORU1 through ORU6. The optical repeat units have associated optical thicknesses $OT_1$ through $OT_6$, respectively, as shown. In practice, more than 6 optical repeat units would ordinarily be used, but depending upon the application less than 6 can also be used. Also, although only two distinct optical layers A,B are shown as making up a given optical repeat unit, this is also not meant to be limiting since more than two such layers can be used, and tie layers that promote adhesion between the different optical layers can also be included.

The physical thicknesses and indices of refraction of the various optical layers shown in FIG. 1 are selected so as to produce reflector 10, which may be a mirror or a polarizer as desired. In the case of a mirror, the refractive indices of any given layer A or B for light whose electric field is polarized along the x- and y- directions (the y-axis is directed into the plane of the drawing), herein referred to as the x- and y-indices, respectively, are substantially the same but different from the x- and y-indices of its neighboring optical layers B or A, respectively. In the case of a polarizer, it is preferable that all of the optical layers A,B,C, etc. in an optical repeat unit have substantially the same index along one in-plane direction. Along the other in-plane direction, at least one of the optical layers has an index that differs substantially from another of the optical layers in the optical repeat unit.

As is known in the art, the thickness of the optical repeat units can be graded, i.e. change slowly in thickness from the optical repeat units at the top of the film to the optical repeat units at the bottom of the film to increase the reflection or transmission bandwidth of the reflector.

The optical layers A,B,C, etc. also each have a z-index associated therewith, which is the refractive index for light whose electric field is polarized along the z-axis. The z-index affects only obliquely incident light, and then only that polarization state of the light that lies in the plane of incidence (referred to as p-polarized light), rather than the polarization state that is perpendicular to the plane of incidence (s-polarized light).

In one aspect of this invention, a plurality of the optical repeat units in reflector 10 include form birefringent optical layers in combination with isotropic optical layers, with other form birefringent optical layers, or with intrinsic birefringent optical layers in a manner that provides improved control of the reflectance (or transmission) of p-polarized light at highly oblique angles. In some instances the form birefringent optical layers are composed of materials that are generally isotropic in nature. These generally isotropic materials are deposited in a known manner to produce optical layers having a substantial amount of birefringence. A positive uniaxial film layer can be fabricated from an isotropic material by encouraging columnar growth of the material in a direction normal to the surface of the substrate and by providing for voids between the columns. A negative uniaxial film layer can be made via the deposition of alternating smooth microlayers of isotropic materials having a large index differential.

Such form birefringent optical layers can be stacked in an alternating fashion with a second optical layer, such as an isotropic material layer or a birefringent material layer, to construct a multilayer interference mirror. The second optical layer in such a construction could be of either an intrinsic or form birefringent type. In order to provide the desired control of the reflectivity of p-polarized light by such a mirror, the relationship of the alternating z-indices of refraction with the corresponding in-plane indices, should be selected according to the principles prescribed for birefringent mirrors already known in the art. Such a mirror can be either narrow band or broadband, and can be designed with coincident bandedges for s- and p-polarized light. Either the left bandedges or the right bandedges, or both, may be made coincident at all angles of incidence by the choice of appropriate birefringent indices of the alternating layers.

For reflectors that act as wavelength specific filters, especially those immersed in a high index medium such as glass, the different reflectivity for s- and p-polarized light creates many problems for the optical filter designer. The use of birefringent multilayer stacks allows the design of filters which reflect s- and p-polarized light equally, or in some cases, at least with coincident bandedges for s- and p-polarized light. See, e.g., the discussion in PCT Publication WO 99/36258, "Color shifting film". The coincidence of bandedges for s- and p-polarized light in these stacks is quite insensitive to layer thickness and index errors.

Form birefringence can be very large for high index materials such as Si, Ge, Te, and other semiconductors such as the III–V and II–VI compounds. Tertiary compounds can also be utilized. Unique mirrors and polarizers can be made from alternating high and low birefringent film layers, or alternating high positive and high negative birefringent film layers. For simplicity, an optic axis of a birefringent polarizer can be treated as a birefringent mirror for light which has its plane of polarization parallel to that axis. The Fresnel reflection coefficients for s and p-polarized light incident on an interface of two uniaxial birefringent materials 1 and 2 are given (11) by equations 1 and 2:

$$r_p = \frac{n_{2z}*n_{2xy}\sqrt{n_{1z}^2 - n_o^2\text{Sin}^2\theta_o} - n_{1z}*n_{1xy}\sqrt{n_{2z}^2 - n_o^2\text{Sin}^2\theta_o}}{n_{2z}*n_{2xy}\sqrt{n_{1z}^2 - n_o^2\text{Sin}^2\theta_o} + n_{1z}*n_{1xy}\sqrt{n_{2z}^2 - n_o^2\text{Sin}^2\theta_o}} \quad \text{Eq. (1)}$$

$$r_s = \frac{n_{2xy}^2\sqrt{n_{1xy}^2 - n_o^2\text{Sin}^2\theta_o} - n_{1xy}^2\sqrt{n_{2xy}^2 - n_o^2\text{Sin}^2\theta_o}}{n_{2xy}^2\sqrt{n_{1xy}^2 - n_o^2\text{Sin}^2\theta_o} - n_{10}^2\sqrt{n_{2xy}^2 - n_o^2\text{Sin}^2\theta_o}} \quad \text{Eq. (2)}$$

θo refers to the incidence angle in the incident medium of index $n_o$. Equation 2 is the same as for isotropic materials. By inspection of equations 1 and 2, we can arrive at the effective interfacial indices for the ith layer of a birefringent material stack at any angle of incidence:

$$n_{is}^{int} = \frac{\sqrt{n_{ixy}^2 - n_o^2\text{Sin}^2\theta_o}}{\text{Cos}\theta_o} \quad \text{Eq. (3)}$$

for s-polarized light, and $$n_{ip}^{int} = \frac{n_{ixy}n_{iz}\text{Cos}\theta_o}{\sqrt{n_{iz}^2 - n_o^2\text{Sin}^2\theta_o}} \quad \text{Eq. (4)}$$

for p-polarized light. Equations 3 and 4 provide effective indices for calculating reflection coefficients for the interface of two birefringent materials. These effective indices can be utilized in equations for isotropic materials.

The center wavelength $\lambda_0$ for a reflection band follows from a simple relation:

$$\lambda_o = 2(n_1^{phz}d_1 + n_2^{phz}d_2) \quad \text{Eq. (5)}$$

where $d_1$ and $d_2$ are the physical thicknesses and $n_1^{phz}$ and $n_2^{phz}$ are the effective indices of each material used for determining the optical thickness (i.e., phase thickness) of the layers. These effective phase indices of uniaxial birefringent materials are:

$$n_{is}^{phz} = \sqrt{n_{ixy}^2 - n_o^2\text{Sin}^2\theta_o} \quad \text{Eq. (6)}$$

for s-polarized light, and $$n_{ip}^{phz} = \frac{n_{iyx}}{n_{iz}}\sqrt{n_{iz}^2 - n_o^2\text{Sin}^2\theta_o} \quad \text{Eq. (7)}$$

for p-polarized light.

Thin film stacks incorporating layers such as the negative uniaxial form birefringent film of FIG. 2 below can be modeled using conventional thin film software if the constituent microlayers are isotropic and all microlayers are considered individually. Such software is based on a 2×2 matrix mathematical model. Alternately, such stacks, or optical film stacks comprising birefringent materials, or form birefringent layers such as those of FIG. 7, can be modeled using a conventional 4×4 matrix approach such as that outlined in D. W. Berreman, "Optics in Stratified and Anisotropic Media: 4×4-Matrix Formulation", J. Opt. Soc. Am. 62 (1972), pp. 502–510. Further details of this approach are also given in the text entitled *Ellipsometry and Polarized Light* (Elsevier, 1987) by Azzam and Bashara. When using this latter method, a form birefringent layer is considered as a single layer with the appropriate birefringent indices. Alternatively, a multilayer stack of birefringent layers can be modeled with a 2×2 matrix approach if the indices and optical thickness of the layers are represented by the effective indices and effective thickness values given by equations 3 through 7.

Negative Uniaxial Form Birefringent Optical Layers

In a preferred embodiment, negative uniaxial birefringent optical layers can be made by alternate deposition of very thin low and high index isotropic layers, which are individually referred to herein as microlayers. Stacks such as these can be fabricated from conventional isotropic materials vacuum deposited in dense microlayers without voids and without the corresponding problems associated with filling of voids by water or other materials that would change the effective index of refraction.

Optically, such a composite optical layer behaves similarly to a single negative uniaxial birefringent material layer. In the limit of infinitely thin alternating layers, the ordinary and extraordinary indices of the composite material are given by the following known formulae:

$$n0 = \sqrt{\frac{fl\, nl^2 + fh\, nh^2}{fl + fh}}; \quad \text{Eq. (8)}$$

$$ne = \sqrt{\frac{1}{\frac{fl}{nl^2} + \frac{fh}{nh^2}}}; \quad \text{Eq. (9)}$$

where $n_l$ and $n_h$ are the indices of the low and high index isotropic materials, and $f_l$ and $f_h$ are the fractional physical thickness of the low and high index layers respectively ($f_l=1-f_h$). In practice, the optical thickness of each high/low index microlayer pair need be only about 1/10 wave to approximate these theoretical values, and even greater thicknesses can be used successfully as discussed below. Such a composite layer is shown in the cutaway perspective view of FIG. 2, where numeral 14 identifies the form birefringent optical layer as a whole and numerals 16, 18 identify the high and low index microlayers respectively. The z-direction is chosen as the axis normal to the film plane, and indices of refraction along this direction are referred to (as before) as the z-index or $n_z$. A common term for the index in this direction for a negative uniaxial plate is the extraordinary index $n_e$. The indices along the x and y axis are referred to as the in-plane indices, as above, and are commonly referred to as the ordinary index $n_o$ if the film is symmetric (isotropic) within the plane of the film.

Although the Equations 8 and 9 are written for layers in which two different types of microlayers are used, this is not intended to be limiting. Specifically, three, four, or more different microlayers, each composed of a unique optical material different from the others, can also be used within a form birefringent optical layer.

Figure 2:
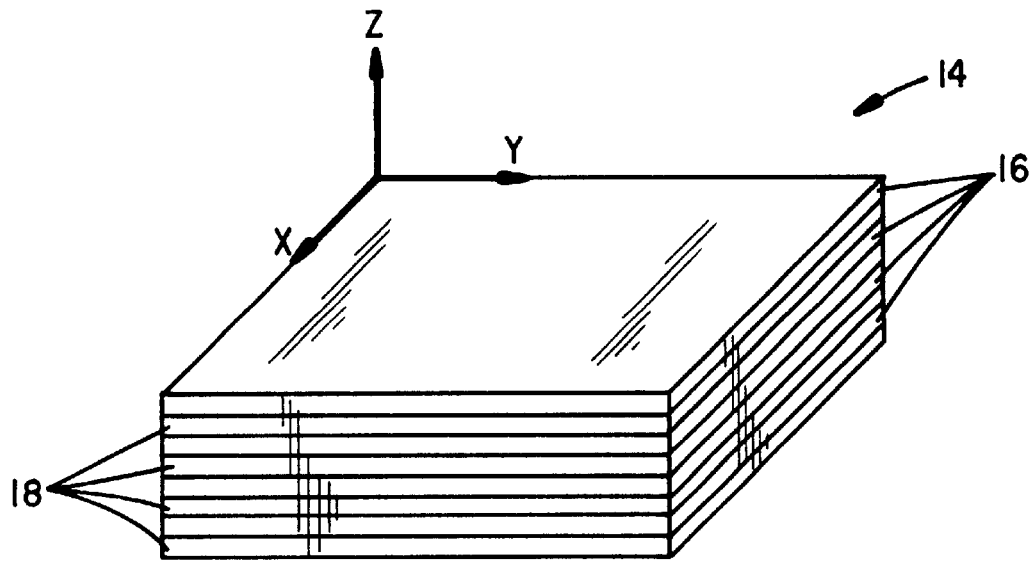
FIG. 2 is a perspective view of a form birefringent layer composed of a sequence of alternating high and low index microlayers.
Figure 3:
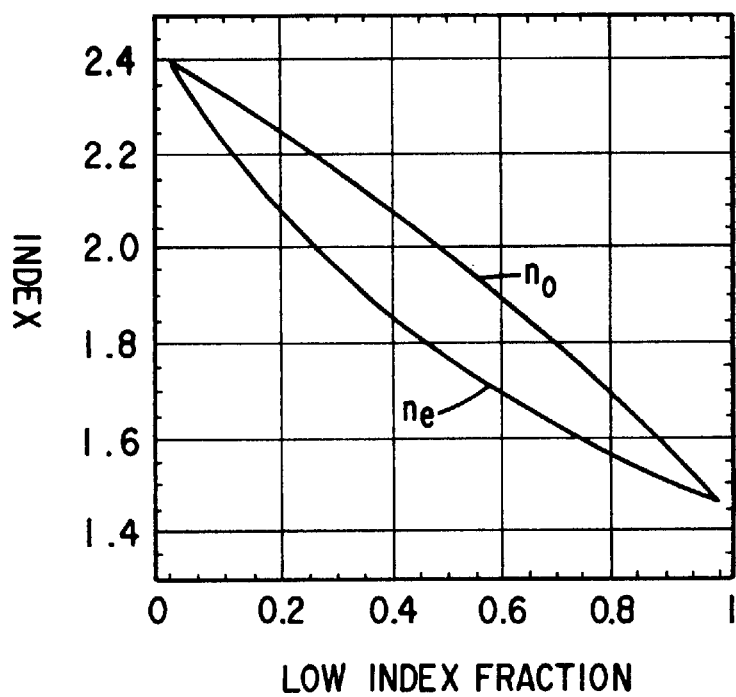
FIG. 3 is a graph of the in-plane and out-of-plane effective refractive indices of a form birefringent layer similar to FIG. 2 for a particular set of materials, as a function of the fractional thickness taken up by the low index microlayers.

An example of a negative uniaxial form birefringent layer, having the conventional design shown in FIG. 2, is illustrative. Where the high index microlayers 16 are composed of $TiO_2$ (index≈2.4) and the low index microlayers 18 are composed of $MgF_2$ (index≈1.46), Equations 8 and 9 yield values for the ordinary ($n_o$, i.e. $n_x$ and $n_y$) and extraordinary ($n_e$, i.e. $n_z$) indices of refraction that are plotted in FIG. 3 as a function of the fractional thickness of layer 14 taken up by all of the low index microlayers 18. As shown, birefringence ($n_o-n_e$) on the order of about 0.2 is readily achievable when the low index microlayers collectively make up about half of the overall optical layer 14 thickness.

Figure 4:
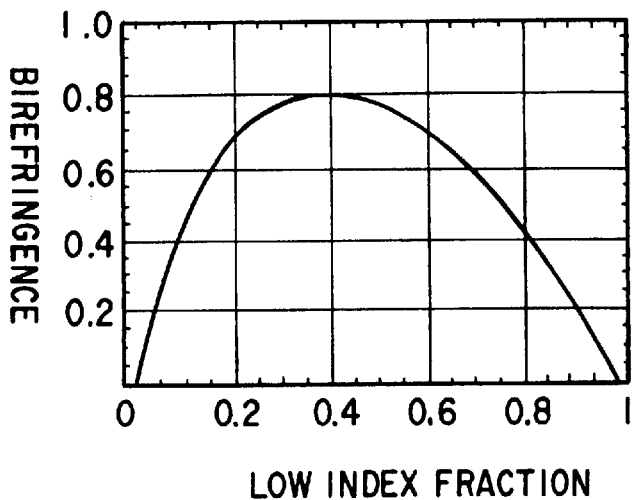
FIG. 4 is a graph similar to that of FIG. 3 but for a different set of materials, and where the difference between the in-plane and out-of-plane indices is plotted.

Even larger values of birefringence can be obtained by using alternating layers having a greater index difference. Again using Equations 8 and 9 but now for high index microlayers 16 made of Si (index≈3.0 in the near IR) and low index layers 18 made of $SiO_2$ (index≈1.45 in the near IR), FIG. 4 plots the birefringence ($n_o-n_e$) as a function of the fractional thickness taken up by low index microlayers 18. In this case, $\Delta n = n_o - n_e \approx 0.82$ at $f_f \approx 0.39$, where $n_0 \approx 2.86$ and $n_z \approx 2.04$.

Figure 5:
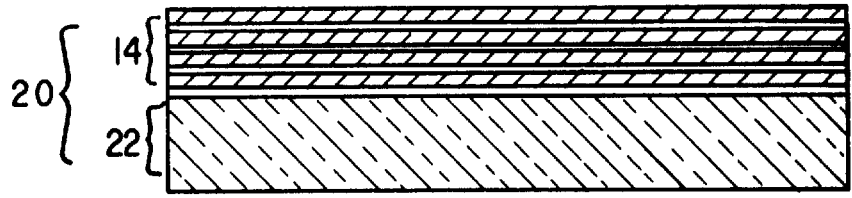
FIG. 5 is a sectional view of an optical repeat unit incorporating a form birefringent optical layer similar to that of FIG. 2.

One embodiment of the present invention is a thin film multilayer reflector comprised of optical repeat units that contain a negative uniaxial form birefringent optical layer of the type illustrated in FIG. 2. The simplest optical repeat unit 20 consists essentially of such a form birefringent layer 14 and a second optical layer 22, as illustrated in the sectional view of FIG. 5. The second layer 20 can be isotropic or birefringent. The optical repeat unit 20 as shown in FIG. 5 can be described by the notation $[(H/8L/8)^4]M$, for the particular case where the low index microlayer 18 fraction of the composite optical layer 14 is 0.50, or 50%. Of course, the birefringence of optical layer 14 can be optimized according to FIG. 3 or 4 by adjusting the ratio of low to high index material. The H/8L/8 notation is used for convenience only to mean that the layer 14, which has an overall optical thickness of about ¼ wave, contains 8 alternating microlayers. M refers to an optical layer within the ORU that preferably has an index of refraction intermediate that of individual layers H and L, although the layer M can also have an index the same as the H or L layer, or higher than the H layer or lower than the L layer. The M layer itself can be intrinsically birefringent or form birefringent. The terms H, L, and M represent nominally ¼ wave thick layers, with the understanding that the relative thicknesses can be optimized for example to maximize form birefringence. The z-index relationships may be very different from the in-plane index relationships, and are selected to produce a desired optical performance.

Figure 6:
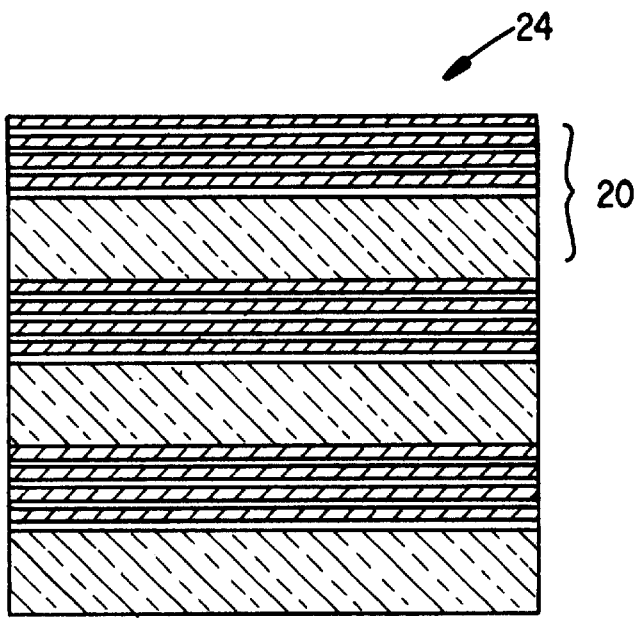
FIG. 6 is a sectional view of a multilayer reflector incorporating a plurality of optical repeat units as shown in FIG. 5.

A simple quarterwave stack mirror 24 using this repeat structure is illustrated in cross section in FIG. 6. The repeating ORUs 20 of FIG. 6 can be represented as $[(H/8L/8)^4]M\ldots,[(H/8L/8)^4]M$. In a further embodiment, the layer thicknesses can be individually selected during deposition to improve the optical performance of the stack for properties such as for example bandwidth, edge slope, and overall reflectivity, as is known in the art. However, in certain circumstances there are lower limits on the number of microlayers in one negative form birefringent layer as discussed below.

Positive Uniaxial Form Birefringent Optical Layers

The repeating microlayer composite films discussed above exhibit negative uniaxial birefringence. To produce an optical layer having a positive uniaxial birefringence, the form birefringence of microstructured films can be utilized as is known in the art. Briefly, by carefully controlling the vacuum deposition parameters, films can be made that have a pattern of microscopic voids that define a closely packed arrangement of minute columns or cylinders that are oriented generally along the z-axis. Transition metal oxides such as $Ta_2O_3$, $TiO_2$, $ZrO_2$, and $HfO_2$ have been deposited in this fashion, but other isotropic or birefringent materials can be used as well. In addition to such thin film deposition processes, a number of other known techniques can be used to produce the necessary microstructures for a positive uniaxial optical layer. Microlithography, reactive ion etching, and sputter etching are examples of such techniques. The form birefringence of columnar films or other microstructured materials can be very large if the bulk indices of refraction of the materials used are large. In the case of intrinsically birefringent materials, the form birefringence can either add or subtract from the intrinsic birefringence values.

Figure 7:
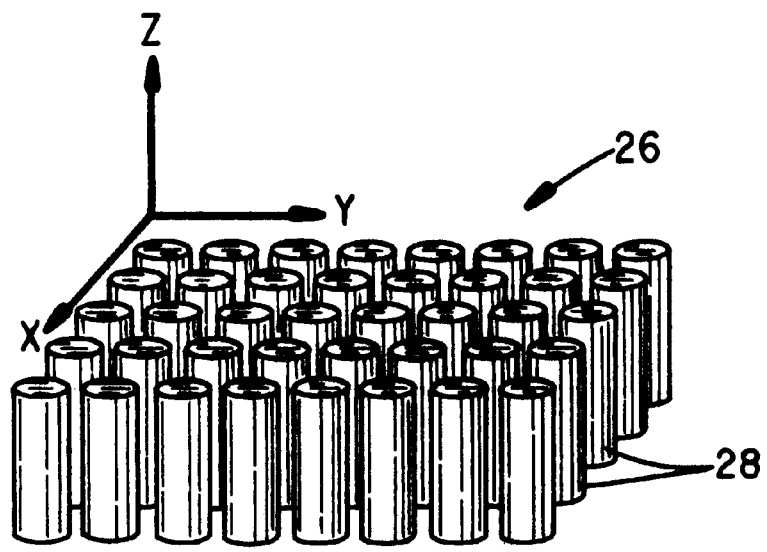
FIG. 7 is a perspective view of another type of form birefringent optical layer.

A perspective view of an idealized thin film columnar optical layer 26 with positive form birefringence is shown in FIG. 7. The individual columns 28 formed as a result of the pattern of voids have transverse demensions in the x-y plane that are much larger than the molecules of the material but much smaller than the wavelength of light of interest. The length of the columns 28, however, can be as large as ¼ wave or more, i.e., the thickness of optical layer 26.

Incorporating a plurality of alternating microlayers of different columnar structured material films into a single optical layer can produce either negative or positive unixial birefringence. If only one layer of columnar structured material is used, and the columnar growth is normal to the surface of the substrate, then only positive uniaxial form birefringent films are produced. The birefringence of such microstructured optical layers can of course be enhanced by the use of inherently birefringent materials in their fabrication. Some materials can be either isotropic or birefringent, depending on the chosen deposition process.

Figure 8:
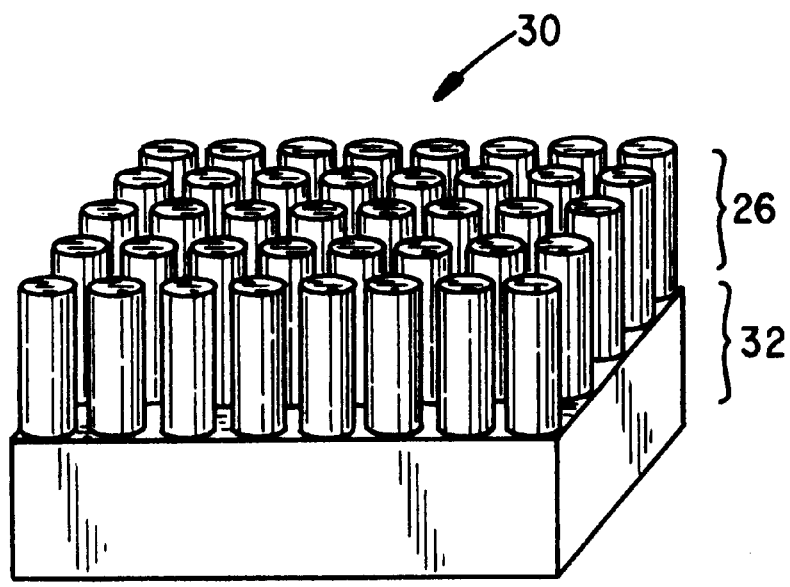
FIG. 8 is a perspective view of an optical repeat unit incorporating a form birefringent optical layer similar to that of FIG. 7.

Positive uniaxial optical layer 26 can be used in an optical repeat unit 30 in combination with another optical layer 32, as shown in the perspective view of FIG. 8. The other optical layer 32 can be isotropic, intrinsically birefringent, or form birefringent as desired. As in all of the embodiments presented here, the optical repeat unit can contain more than two optical layers. And, as mentioned previously, the thickness of the optical repeat units can be graded to tailor the spectral transmission and reflection curves as desired.

Figure 9:
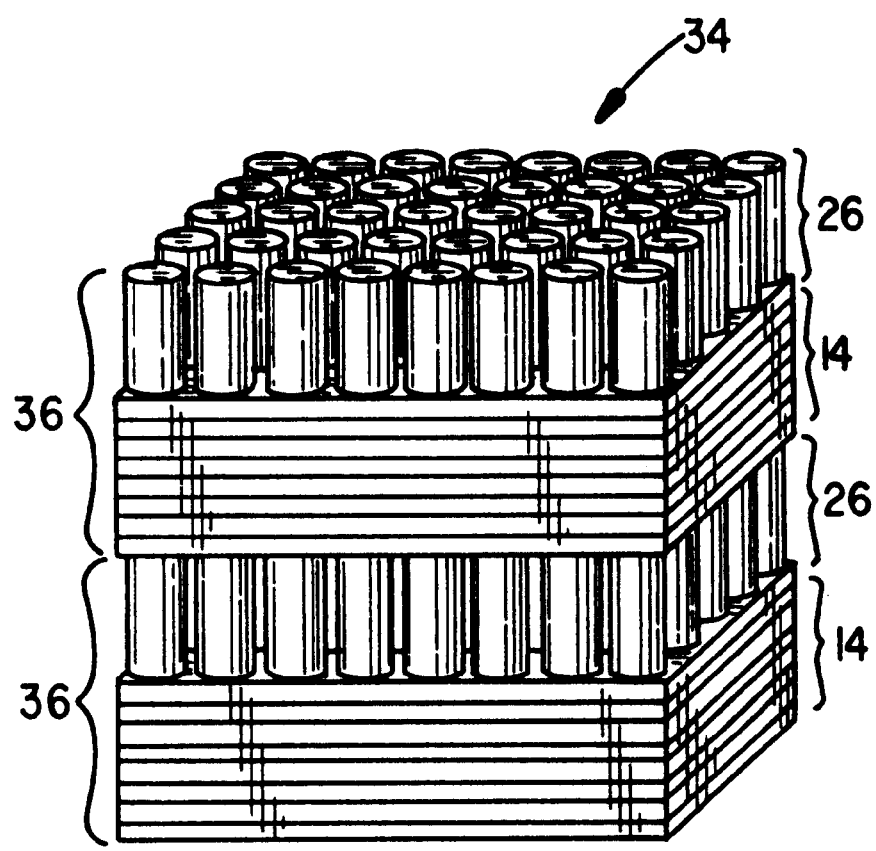
FIG. 9 is a perspective view of a portion of a multilayer reflector comprising a plurality of optical repeat units of FIG. 8.

The maximum effects of birefringence in a repeating stack can be obtained by utilizing an optical repeat unit that combines both positive and negative birefringent layers. In a preferred embodiment, a multilayer thin film reflector 34 comprises optical repeat units 36 that have both positive and negative form birefringent layers, as depicted in the perspective view of FIG. 9.

Positive and negative uniaxial birefringent layers having different relative values of $n_o$ and $n_z$ will yield many possible combinations of in-plane and z-index relationships. Two classes of structures which most impact the reflectivity of p-polarized light relative to s-polarized light are represented by the phase diagrams of FIGS. 10a and 10b.

Figure 10A:
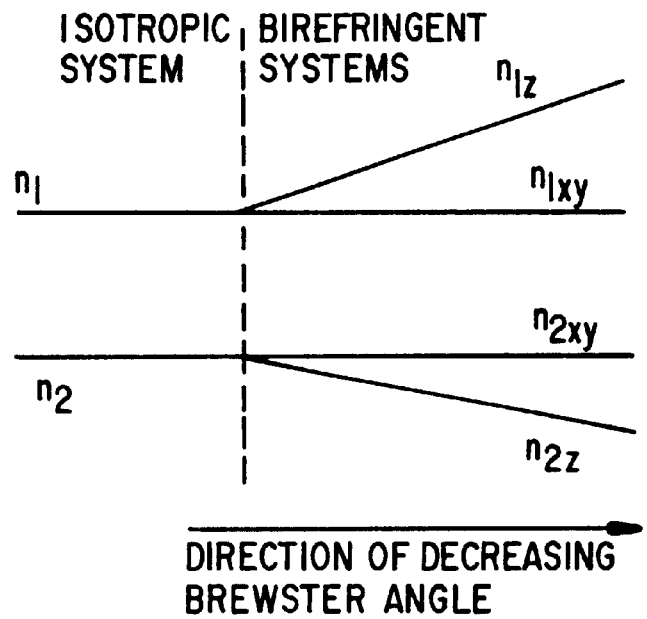
FIGS. 10a and 10b are phase diagrams that depict different relationships between in-plane indices and out-of-plane indices for an interface between two optical layers, and how those relationships affect the reflectivity of the interface.
Figure 10B:
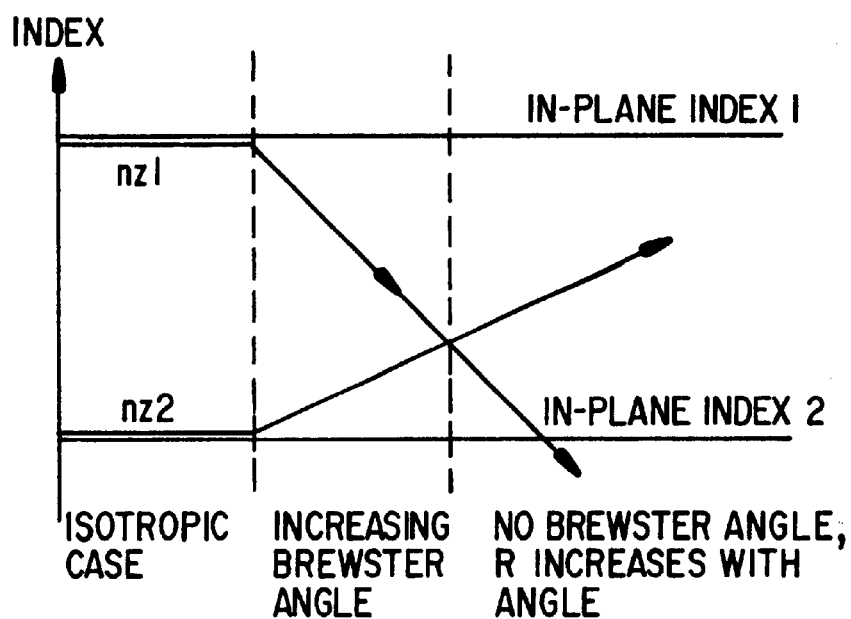

In FIG. 10a, the higher index optical layer (subscript 1) is isotropic on the left side of the figure and positive uniaxial on the right side, and the lower index optical layer (subscript 2) is isotropic on the left side and negative uniaxial on the right side. Increasing birefringence is represented by the arrow to the right. The most notable feature of this diagram is that the z-index differential is larger than the in-plane index differential. This results in a decreased Brewster angle and, in general, weaker reflectivity for p-polarized light compared to that of an all isotropic stack having the same in-plane indices and stack design. Only one of the optical layers forming the interface need be birefringent to achieve this effect, but if positive and negative birefringent materials are combined, the effect can be increased.

If the two optical layers forming an interface are chosen such that the z index differential is less than that of the in-plane differential, the Brewster angle increases. For even larger values of birefringence, if the relative z-index values cross (i.e. the z-index differential has the opposite sign as the in-plane index differential) then no Brewster angle exists, and the p-polarization reflectivity and bandwidth approach, and can surpass, the reflectivity and bandwidth for s-polarized light at all angles of incidence. These cases are summarized by FIG. 10b. For the special case of $n_{1z}=n_{2xy}$ and $n_{2z}=n_{1xy}$ (not shown in the figure), $r_p=-r_s$, meaning that the reflectivity and bandwidths for s- and p-polarized light will be identical at all angles of incidence.

Biaxial Form Birefringent Optical Layers

As noted above, biaxial form birefringent films are known in the art. In such films, the in-plane refractive indices differ substantially from each other and from the out-of-plane axis. The differing in-plane indices are important for multilayer reflectors that are used as polarizers, since in a reflective polarizer it is generally desired to match the in-plane indices of adjacent optical layers along one in-plane axis, but to mismatch the in-plane indices of those same optical layers along the orthogonal in-plane axis. In many instances it is useful to fabricate reflecting polarizers that operate at non-normal incidence. This is especially true with polarizing beamsplitters, which typically operate at 45 degrees, and in many cases are desirably immersed in glass, i.e. adhered to 45 degree prisms which are optically coupled along their diagonals with a clear adhesive. To provide for polarizers that remain highly reflective at these angles, the z-index relations of the optical layers can be utilized.

The optics of the uniaxial birefringent multilayer mirrors are summarized by Equations 1 through 7. In these equations the in-plane indices, indicated as $n_{xy}$, are assumed to be the same in both the x and y directions, as well as all in-plane directions between these two axes. However, if the indices of the layers are different along one in-plane optic axis than the other, then the resulting asymmetric reflector, or polarizer, can be treated as two kinds of mirrors. For example if $n_x$ differs from $n_y$, within one or more of the composite layers of an optical repeat unit, then the layer to layer index differentials will be different along the x axis compared to the y axis. The ratio of in-plane differential to the z-index differential will also be different along the two axes in this case as well. Thus there are different reflective and transmissive properties for light having its plane of polarization parallel to the x axis compared to light with its plane of polarization parallel to the y axis of the same article. As an example, a reduced Brewster angle may exist along the y axis at the interface of two layers, but the Brewster angle may be imaginary along the x axis. In other words, the z-index differential may be the same or larger than the in-plane index differential along one axis (x), and of the same sign as the in-plane value. But the z-index differential may be smaller than the in-plane index differential along the other in-plane axis (y), or in one preferred embodiment it may have the opposite sign as the in-plane index differential (y). The performance of mirrors and polarizers depend greatly on such parameters. With a reduced Brewster angle, the reflectivity of p-polarized light for an interface between two optical layers decreases more rapidly with angle from normal incidence than for isotropic layers. If the z indices of a quarterwave stack are matched, the bandwidth and reflectivity for p-polarized light is constant for all angles of incidence. Such articles are possible to produce using the appropriate form birefringent layers. For oblique vacuum deposition conditions microstructured film that is produced is often biaxially birefringent, and the various combinations of properties between the two in-plane axes just described can be achieved.

Design Considerations

It is generally known that a stack of alternating microlayers will behave optically as a single layer of a birefringent material if the periodicity is small enough and the number of periods N is large enough. For convenient calculational purposes, the number of layers is sometimes assumed to be infinite. However, the limits of the microlayer number and thickness that would still produce a mirror with birefringent mirror properties has not been investigated. In a quarterwave thick layer, atomic or molecular dimensions, as well as crystallite size and material mixing, tend to limit the microlayers to less than about 20 layers per quarterwave, that is, greater than 1/80th wave thick in the visible portion of the spectrum. More layers are possible at longer wavelengths. However, from a practical point of view, it may be desirable to minimize the number of microlayers in such a stack. One aspect of this invention is the discovery that layers as thick as about 1/12th wave, or only 3 microlayers per quarterwave optical layer, still impart to a multilayer mirror several useful properties that are characteristic of a birefringent mirror.

Computational Examples

A number of example multilayer mirror films are given below, each of which have a structure similar to that of FIG. 6. The examples differ in the number (and thus also the thicknesses) of individual microlayers in the form birefringent optical layer. The other optical layer in each optical repeat unit is a ¼ wave isotropic layer. The overall reflective film in all of these cases has 20 half wave layer pairs (i.e., 20 form birefringent optical layers and 20 isotropic optical layers), and for each example is immersed in a material of index 1.70. The form birefringent layers each have alternating 2.4 and 1.46 index microlayers. The form birefringent optical layers are each held at a constant ¼ wave overall thickness, but the number and thickness of the microlayers composing such layers is varied. Commercially available thin film design software was used to calculate the spectral response for each example.

EXAMPLE 1

Figure 11:
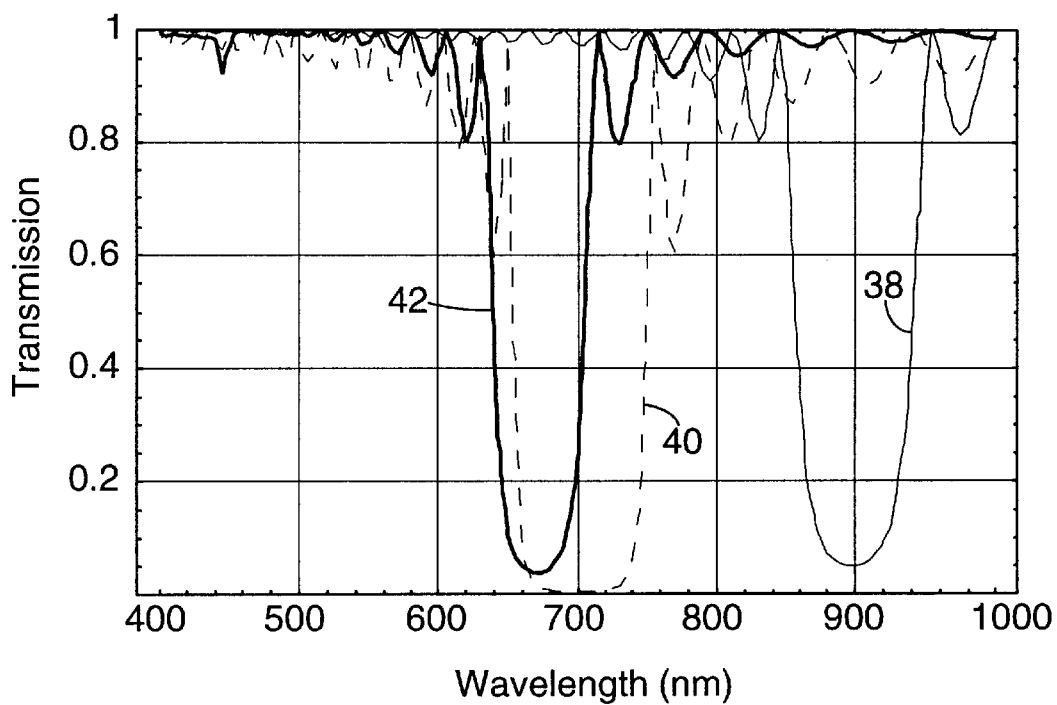
FIGS. 11 through 17 are graphs of calculated transmission as a function of wavelength for various multilayer mirror embodiments.

Mirror Film Having 16 Microlayer Negative Unaxial Optical Layers Alternating with Isotropic Optical Layers In this first example, 8 pairs or 16 microlayers total were used in each ¼ wave form birefringent optical layer. The microlayers, with indices of 1.46 and 2.4, thus have thicknesses of about 6.88 and 8.12 nm respectively. This corresponds to a low index material fraction of about 0.46. The effective indices of this composite layer are approximately 2.04 (in-plane) and 1.80 (out-of-plane). This form birefringent layer alternates with a 126 nm thick isotropic optical layer of index 1.82. The stack is immersed in a 1.70 index medium. FIG. 11 shows the calculated transmission spectra at normal incidence (curve 38) and at 45° for s- and p-polarized light (curves 40 and 42, respectively).

Figure 12:
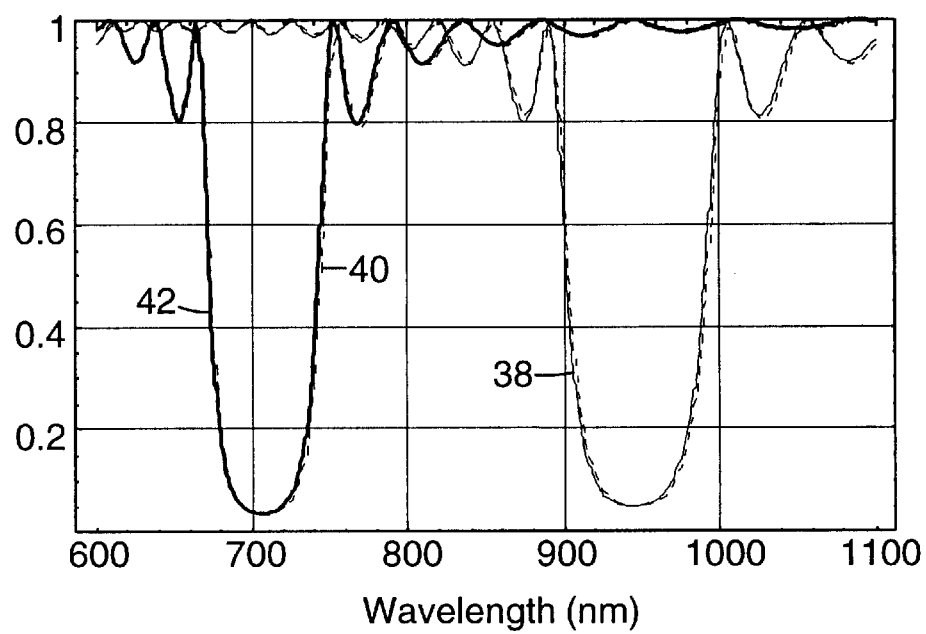

Note in FIG. 11 that the fractional bandwidth and peak height for p-polarized light is the substantially the same at 45 degrees as at normal incidence in a high index medium of index 1.7. For a mirror fabricated only with two alternating isotropic optical layers, the reflectance of p-polarized light is close to zero (and the transmission is close to one) at this angle due to the Brewster effect. The spectra shown in FIG. 11 are very similar to those obtainable from a birefringent mirror fabricated from intrinsically birefringent materials. The normal incidence and 45 degree p-polarization spectra of FIG. 11 (curves 38 and 42) can be directly compared to the calculated spectra of a birefringent mirror made with 20 pairs of high index birefringent material having $n_{xy}=2.03$, $n_z=1.80$, and low index isotropic material having $n_{xyz}=1.82$. The comparison is shown in FIG. 12, where the calculated spectra for the comparison mirror film are shown in broken lines and nearly coincide with the respective curves 38, 42. This demonstrates that a form birefringent layer, ¼ wave thick and composed of 16 microlayers performs substantially like an intrinsic birefringent ¼ wave thick layer in a ¼ wave mirror stack.

EXAMPLE 2

Figure 13:
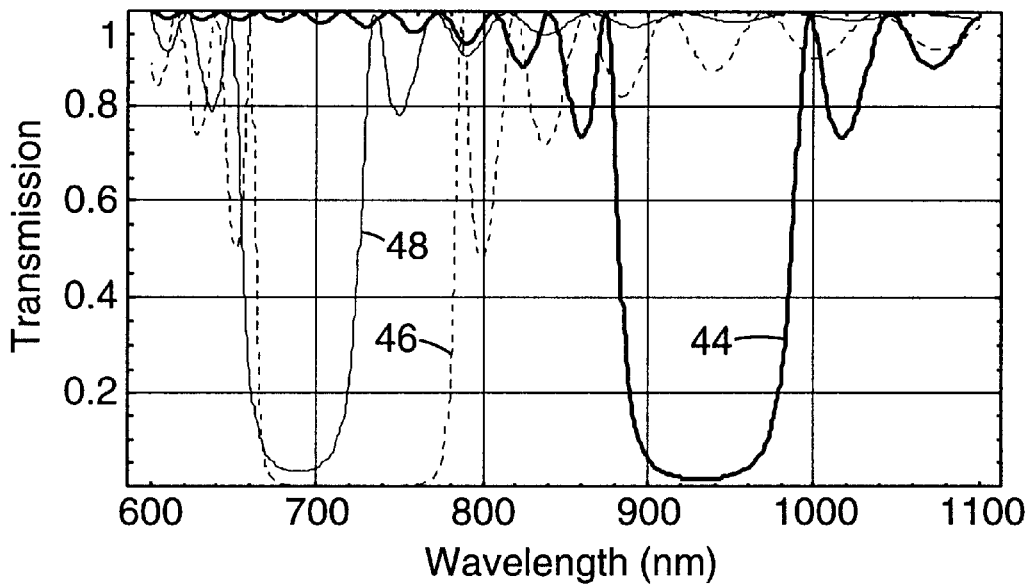

Another Mirror Film Having 16 Microlayer Negative Uniaxial Optical Layers Alternating with Isotropic Optical Layers The left bandedges of s- and p-polarized light in FIG. 11 can be brought into closer coincidence by an adjustment in the refractive index of the intermediate index material. This Example 2 mirror film therefore was of the identical construction as the Example 1 film, except that the refractive index of the isotropic optical layer was changed from 1.82 to 1.77. FIG. 13 shows the resulting spectra, where curve 44 is for normally incident light, and curves 46,48 are for s- and p-polarized light respectively that is incident on the mirror film at 45°. The normal incidence and s-polarization reflectivities are stronger due to the larger in-plane index difference (2.04−1.77 versus 2.04−1.82). The p-polarization band is slightly weakened because of the deviation from the z-matched condition in the direction of isotropic stacks. Instead of changing the intermediate index material, a different low index fraction in the microlayers may be chosen, or one or both of the low and high index materials of the microlayers may be changed to accomplish a similar effect.

The reflection bandwidth of such stacks may be widened by adding more optical repeating units tuned to different wavelengths. Separate stacks or a continuous gradation of optical thickness of the layer pairs can be utilized.

The manufacture of the multilayer mirror can be simplified by minimizing the number of microlayers in the form birefringent optical layer. The ¼ wave form birefringent optical layers used to generate the spectra presented in FIGS. 11 and 13 had 16 microlayers, with individual layer thickness of ¹⁄₆₄th wave. Similar results are obtained if only 8 microlayers $(H/4L/4)^4$ are used to make the form birefringent optical layers. The individual microlayers in this case are approximately ¹⁄₃₂nd wave thick, although other thicknesses can be used by deviating from 50% low index material fraction.

EXAMPLE 3

Figure 14:
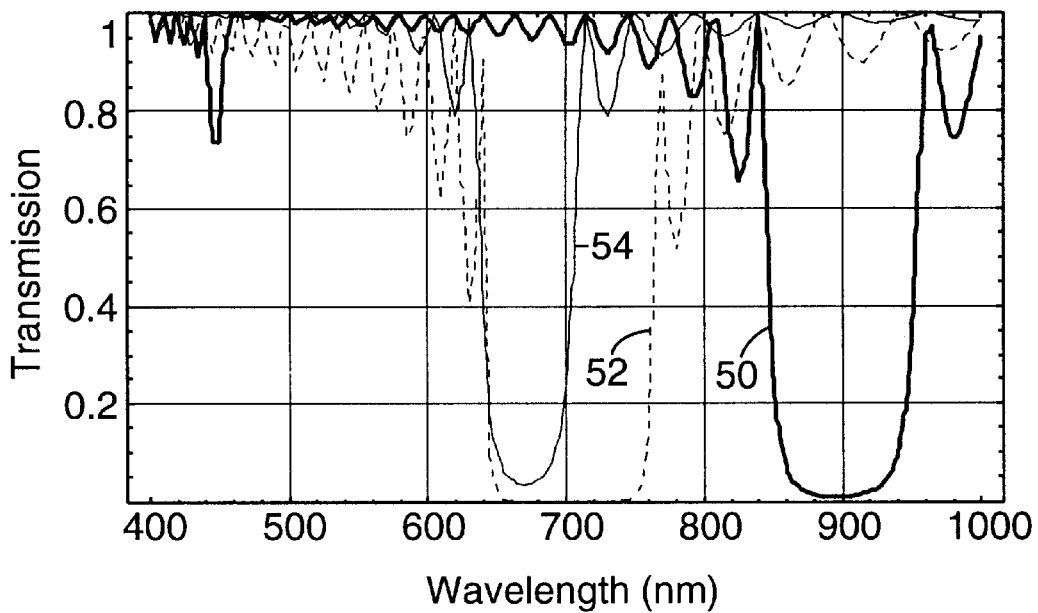

Mirror Film Having 4 Microlayer Negative Uniaxial Optical Layers Alternating with Isotropic Optical Layers In Example 3, the number of microlayers are reduced even further. This multilayer mirror film was of the same construction as that of Example 1, except the form birefringent optical layers each consisted of only 2 pairs, or 4 microlayers. The microlayers were four times as thick as those of Example 1, thus maintaining the low index fraction of 0.46. The thickness of the isotropic optical layers was maintained at 126 nm, and the index maintained at 1.82. With this construction, the spectra of FIG. 14 are obtained. Curve 50 is for normally incident light, and curves 52,54 are for s- and p-polarized light respectively that is incident on the mirror film at 45°. As seen, the p-polarization reflectance band is slightly narrower, and the left bandedges for s and p-polarized light are substantially aligned. The weaker p-polarization reflectance compared to FIGS. 11 or 13 indicate a slightly lessened form birefringent effect when only 4 microlayers are utilized. The second order reflection at 450 nm for normal incidence (curve 50) is also larger than for the case of 16 microlayers illustrated in FIG. 11.

EXAMPLE 4

Figure 15:
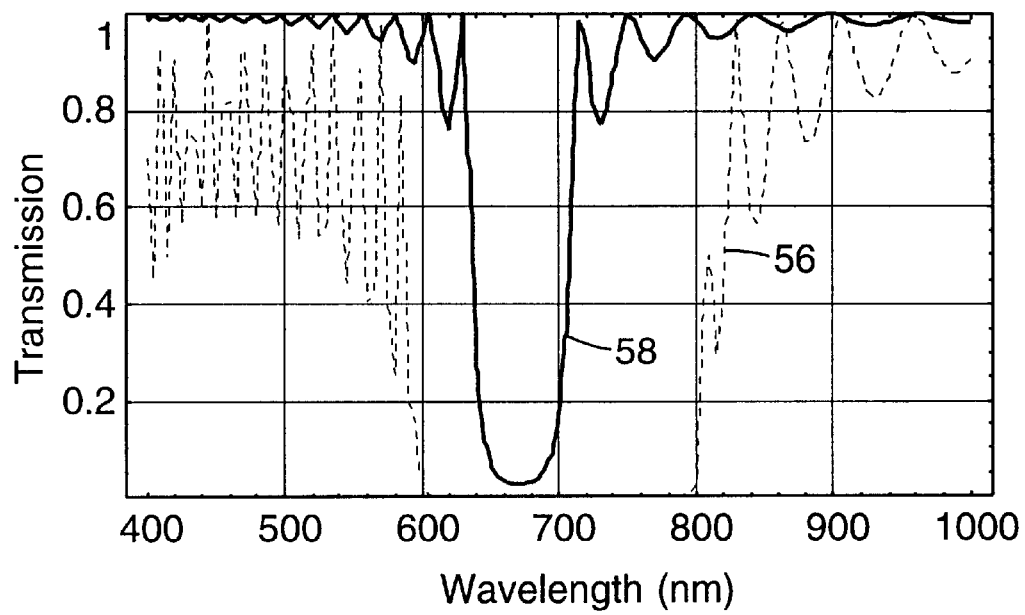

Mirror Film Having 2 Microlayer Negative Uniaxial Optical Layers Alternating with Isotropic Optical Layers However if only 2 microlayers, each nominally ⅛th wave in thickness, are used to make a ¼ wave optical layer (H/2L/2) which alternates with the other optical layer, significant differences are noted in the spectra for s- and p-polarized light, as shown in FIG. 15. The structure here is the same as that of Examples 1 and 4, except that only two microlayers were used. The low index microlayer had a thickness of about 55 nm and the high index microlayer about 65 nm. This structure for the optical repeat unit can be written as (H/2L/2M), with variations of the H/2 and L/2 values. The calculated responses are shown in FIG. 15. Curves 56,58 are for s- and p-polarized light respectively that is incident at 45° (the curve for normally incident light is omitted to avoid confusion). Note that these curves deviate substantially from those of multilayer mirrors made from intrinsic birefringent layers.

EXAMPLE 5

Mirror Film Having 3 Microlayer Negative Uniaxial Optical Layers Alternating with Isotropic Optical Layers In this example, the identical structure as that of Example 1 was used except the ¼ wave form birefringent layer was changed to include only three microlayers, with thicknesses scaled by the factor (16/3). With the indices used in these examples, we have found that three is the minimum number of microlayers per ¼ wave optical layer that substantially imparts the desired birefringent mirror properties to a multlayer mirror stack. The form birefringent layers in this case can be described as either [H/3L/3H/3] or [3H/3L/3], depending on whether the high index microlayer or the low index microlayer are used as the outer microlayers, i.e., the top and bottom microlayers within the form birefringent optical layer. The fraction ⅓ is listed in the formula only for convenience, and can be varied to optimize the form birefringent effects. Since the maximum form birefringent effect occurs at a low index material fraction of less than 0.5, the maximum optical thickness of the high index microlayers can be as large as roughly ¹⁄₁₀th wave thick.

There are advantages of using an odd number of microlayers, such as the use of incompatible materials in the stack. Choice of one structure or the other ([H/3L/3H/3] or

Figure 16:
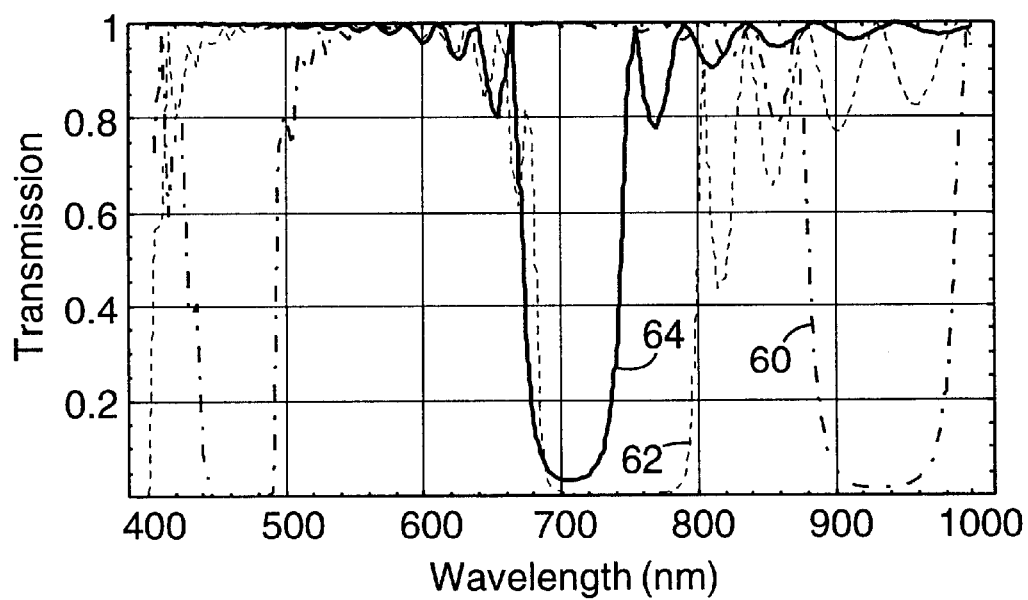
Figure 17:
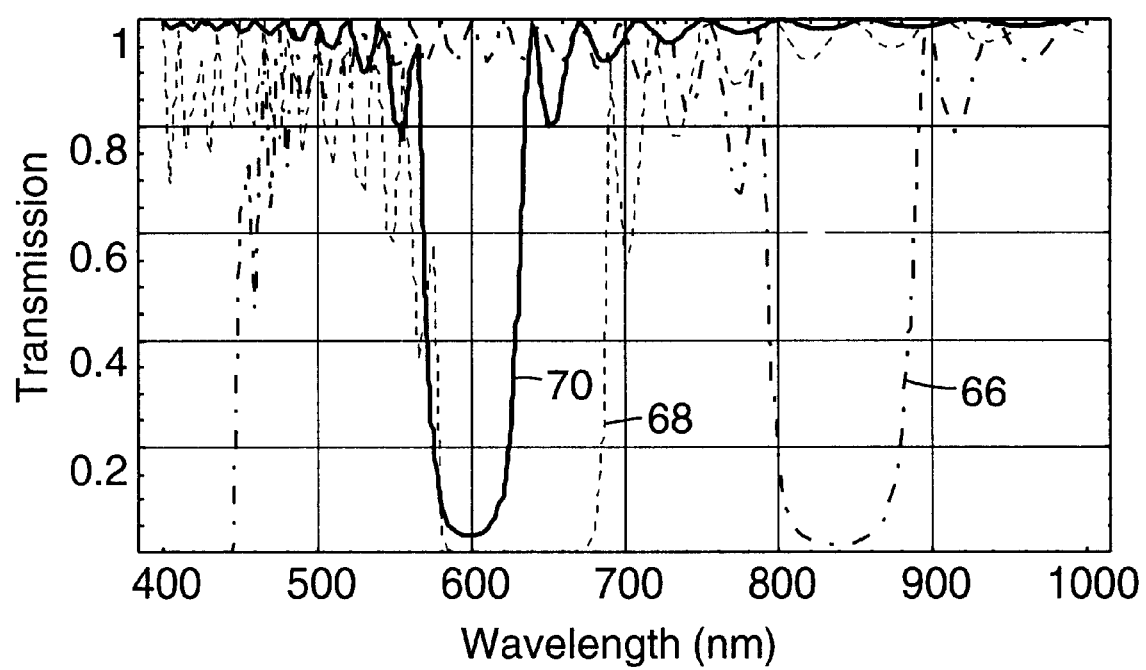

[L/3H/3L/3])depends on the adhesion properties of the H and L index materials to the intermediate index material M, and control of optical effects such as ringing on either side of a stopband. Spectra for the two cases are given in FIGS. 16 and 17 respectively. Curves 60 and 66 are for normally incident light; curves 62 and 68 are for s-polarized light incident at 45°; and curves 64 and 70 are for p-polarized light incident at 45°. An odd number of microlayers can also be used in all other cases having more microlayers per form birefringent optical layer, such as e.g. 5, 7, 9, 11, or more.

Discussion

Although form birefringent films made by vacuum depositing inorganic materials onto a substrate provide certain advantages in manufacturing and in use, form birefringent materials can be made in other ways with materials that need not be inorganic. For example, form birefringent films can be made by incorporating shaped particles in a polymer matrix and then aligning the particles by stretching the film or by other processing techniques involving for example electric or magnetic or mechanical stress fields which can align the particles before the matrix is polymerized or cooled below the glass transition temperature of a given polymeric material. For example, if needle shaped particles having a high index of refraction are arranged in vertical columns in a polymer matrix, similar to columnar growth in vapor deposited films, a positive uniaxial film can be created. In a similar manner, negative uniaxial birefringent films can be made, as well as variety of biaxially birefringent films depending on the shape and orientation of the particles. For example, a film having ny<nx<nz can be made in this manner. Such a film is particularly useful as a phase retardation plate in converting linear to circularly polarized light or vice versa, and can be used either in a multilayer reflector or alone as a phase retardation plate. The orientation process could be sequential with each additional layer, or since the aggregate stack of films in an optical stack is relatively thin, all layers in the stack could be poled at one time. Mechanical means of poling include stretching the films in one or more directions or directional coating techniques. In addition, with use of the electric or magnetic fields directed at an angle to the surface of the film plane, the optic axes can be tilted at an angle to the film axes.

Such form birefringent articles are not restricted to films made with a polymer matrix. Any material that can be processed in a manner that a plurality of shaped material inclusions can be partially or completely aligned while the matrix is in a fluid or plastic state can be utilized to create form birefringent materials. The individual inclusions can also be intrinsically birefringent as well to increase the form birefringence effect. The inclusions can be a polymer of one type that are dispersed in a layer of another type of polymer and oriented by stretching.

Further, negative uniaxial form birefringent layers of the type shown in FIG. 2 can be made by simple polymer coextrusion and stretching operations.

Glossary of Certain Terms

F-ratio: the relative contribution of a given individual layer to the total optical thickness of a given ORU. The f-ratio for the k-th individual layer is:

$$f_k = \frac{n_k \cdot d_k}{\sum_{m=1}^{N} n_m \cdot d_m}$$

where $1 \leq k \leq N$, where N is the number of constituent layers in the ORU, where nk is the relevant refractive index of k-th layer, and $d_k$ is the physical thickness of layer k. The f-ratio of a layer k along a specified optical axis j is denoted $f_{jk}$ and is defined as above but where $n_k$ is the refractive index of layer k along axis j.

Form birefringent layer: a layer (which may comprise a plurality of smaller layers) is said to be form birefringent if it exhibits different refractive indices for different polarization states of light capable of propagating through the layer, the different refractive indices being at least partially the result of an ordered arrangement of distinct structures within the layer, each such structure having at least one dimension that is large compared with the dimensions of molecules but small compared with the wavelength of light.

Fractional Bandwidth: the full spectral width (in units of distance such as nm) at half of the maximum height (i.e., half the amplitude) of the band divided by the center wavelength of the band (which bifurcates the full spectral width).

Light: electromagnetic radiation, whether in the visible, ultraviolet, or infrared portion of the spectrum.

Microlayer: a component layer of a form birefringent layer, the component layer having an optical thickness not more than about one-eighth of the wavelength of light of interest.

Optical Layer: a layer (other than a microlayer) having an optical thickness of at least about $\frac{1}{16}^{th}$ of the wavelength of light of interest.

Optical Repeat Unit ("ORU"): a stack of at least two distinct optical layers which repeats across the thickness of a multilayer optical film, though corresponding repeating layers need not have the same thickness. The optical repeat unit has an optical thickness that corresponds to a half wave of a light wavelength of interest.

Optical thickness: the physical thickness of a given body multiplied by its refractive index. In general, this is a function of wavelength and polarization.

Reflectance Band: a spectral region of relatively high reflectance bounded on either side by regions of relatively low reflectance.

Transmission Band: a spectral region of relatively high transmission bounded by spectral regions of relatively low transmission.

Visible Light: light detectable by the unaided human eye, generally in the wavelength range of about 400 to 700 nm.

Although the present invention has been described with reference to preferred embodiments, workers skilled in the art will recognize that changes can be made in form and detail without departing from the spirit and scope of the invention.

What is claimed is:

1. A multilayer reflector having a plurality of optical repeat units arranged to reflect one or more desired wavelengths of light, wherein at least some of the optical repeat units comprise:

a uniaxial form birefringent optical layer.

2. The reflector of claim 1, wherein the form birefringent optical layer has an in-plane index of refraction, and an out-of-plane index of refraction that is greater than the in-plane index of refraction.

3. The reflector of claim 1, wherein the form birefringent optical layer has an in-plane index of refraction, and an out-of-plane index of refraction that is less than the in-plane index of refraction.

4. The reflector of claim 1, wherein the at least some of the optical repeat units further comprise:

an isotropic optical layer.

5. The reflector of claim 1, wherein the at least some of the optical repeat units further comprise:

a second uniaxial form birefringent optical layer.

6. The reflector of claim 1, wherein the plurality of optical repeat units are arranged to form a device selected from the group consisting of a mirror and a polarizer.

7. The reflector of claim 3, wherein the form birefringent optical layer comprises at least three microlayers.

8. The reflector of claim 3, wherein the form birefringent optical layer has a bottom microlayer and a top microlayer composed of the same material.

9. The reflector of claim 3, wherein the form birefringent optical layer consists essentially of an odd number of microlayers.

10. The reflector of claim 5, wherein the first form birefringent optical layer is positive uniaxial and the second form birefringent optical layer is negative uniaxial.

11. A multilayer reflector having a plurality of optical repeat units arranged to reflect one or more desired wavelengths of light, wherein at least some of the optical repeat units comprise:

an isotropic optical layer; and a form birefringent optical layer.

12. The reflector of claim 11, wherein the form birefringent optical layer is selected from the group consisting of a positive uniaxial optical layer, a negative uniaxial optical layer, and a biaxial optical layer.

13. The reflector of claim 11, wherein the form birefringent optical layer comprises at least three microlayers.

14. The reflector of claim 13, wherein the form birefringent optical layer has a top microlayer and a bottom microlayer composed of the same material.

15. A multilayer reflector having a plurality of optical repeat units arranged to reflect one or more desired wavelengths of light, wherein at least some of the optical repeat units comprise:

an intrinsically birefringent optical layer; and a form birefringent optical layer.

16. A multilayer reflector having a plurality of optical repeat units arranged to reflect one or more desired wavelengths of light, wherein at least some of the optical repeat units comprise a form birefringent optical layer and another optical layer, and wherein a relationship between the out-of-plane refractive indices of the form birefringent optical layer and the another optical layer produces a desired reflectivity of p-polarized light as a function of incidence angle.

17. The reflector of claim 16, wherein the out-of-plane refractive indices differ by an amount less than about 80% of the largest in-plane index differential between the form birefringent optical layer and the another optical layer.

18. The reflector of claim 16, wherein the out-of-plane refractive indices differ by an amount that is opposite in sign to at least a first in-plane index differential between the form birefringent optical layer and the another optical layer.

19. The reflector of claim 16, wherein the out-of-plane refractive indices differ by an amount that is of the same sign as a second in-plane index differential between the form birefringent optical layer and the another optical layer.

20. The reflector of claim 17, wherein the out-of-plane refractive indices differ by an amount less than about 50% of the largest in-plane index differential between the form birefringent optical layer and the another optical layer.

21. The reflector of claim 20, wherein the out-of-plane refractive indices differ by an amount less than about 20% of the largest in-plane index differential between the form birefringent optical layer and the another optical layer.

22. The reflector of claim 21, wherein the first in-plane differential is greater in magnitude than the second in-plane differential.

23. A mirror comprising a plurality of form birefringent optical layers.

24. The mirror of claim 23, wherein the form birefringent optical layers are arranged with at least a second plurality of optical layers to form a plurality of optical repeat units.

25. The mirror of claim 24, wherein the second plurality of layers are substantially isotropic optical layers.

26. The mirror of claim 24, wherein the second plurality of layers are intrinsically birefringent optical layers.

27. The mirror of claim 24, wherein the second plurality of layers are form birefringent optical layers.

28. The mirror of claim 24, wherein the form birefringent optical layers each comprise at least 3 microlayers.

29. The mirror of claim 24, wherein the form birefringent optical layers comprise inorganic material.

30. The mirror of claim 24, wherein the form birefringent optical layers comprise polymeric material.

* * * * *

UNITED STATES PATENT AND TRADEMARK OFFICE
CERTIFICATE OF CORRECTION

PATENT NO. : 6,590,707 B1
DATED : February 3, 2004
INVENTOR(S) : Weber, Michael F.

It is certified that error appears in the above-identified patent and that said Letters Patent is hereby corrected as shown below:

Title page,
Item [56], References Cited, OTHER PUBLICATIONS, "Jacobson et al.," reference, delete "SiO2/Ta2O5" and insert -- $SiO_2/Ta_2O_5$ --, therefor.

Column 2,
Line 14, after "microlayers" delete "30".
Line 17, delete "substrate" and insert -- substrates --, therefor.
Line 22, delete "$(n_x \approx n_y > n_z)$" and insert -- $(n_x \approx n_y < n_z)$ --.

Column 5,
Line 20 (Approx), (Equation 2), delete "
$$r_s = \frac{n_{2xy}^2\sqrt{n_{1xy}^2 - n_o^2 Sin^2\theta_o} - n_{1xy}^2\sqrt{n_{2xy}^2 - n_o^2 Sin^2\theta_o}}{n_{2xy}^2\sqrt{n_{1xy}^2 - n_o^2 Sin^2\theta_o} - n_{1o}^2\sqrt{n_{2xy}^2 - n_o^2 Sin^2\theta_o}}$$
" and
insert --
$$r_s = \frac{n_{2xy}^2\sqrt{n_{1xy}^2 - n_o^2 Sin^2\theta_o} - n_{1xy}^2\sqrt{n_{2xy}^2 - n_o^2 Sin^2\theta_o}}{n_{2xy}^2\sqrt{n_{1xy}^2 - n_o^2 Sin^2\theta_o} + n_{1o}^2\sqrt{n_{2xy}^2 - n_o^2 Sin^2\theta_o}}$$
--, therefor.

Column 7,
Line 53, delete "," before "$[(H/8L/8)^4]M$".

Column 8,
Line 21, delete "demensions" and insert -- dimensions --, therefor.

Column 10,
Line 54, delete "Unaxial" and insert -- Uniaxial --, therefor.

Column 12,
Line 55, delete "[3H/3L/3]" and insert -- [L/3H/3L/3] --, therefor.

UNITED STATES PATENT AND TRADEMARK OFFICE
CERTIFICATE OF CORRECTION

PATENT NO. : 6,590,707 B1
DATED : February 3, 2004
INVENTOR(S) : Weber, Michael F.

It is certified that error appears in the above-identified patent and that said Letters Patent is hereby corrected as shown below:

Column 13,
Line 28, insert -- a -- before "variety".
Line 67, delete "nk" and insert -- $n_k$ --, therefor.

Signed and Sealed this

Seventeenth Day of August, 2004

JON W. DUDAS
*Acting Director of the United States Patent and Trademark Office*